United States Patent [19]

Carroll

[11] Patent Number: 4,610,291

[45] Date of Patent: Sep. 9, 1986

[54] INSULATING SHUTTER PANELS FOR BUILDING OPENINGS

[76] Inventor: Frank E. Carroll, 237 Maple Rd., Barrington, Ill. 60010

[21] Appl. No.: 691,665

[22] Filed: Jan. 15, 1985

Related U.S. Application Data

[63] Continuation-in-part of Ser. No. 329,196, Dec. 10, 1981, Pat. No. 4,475,978.

[51] Int. Cl.⁴ .......................... E06B 3/48; E06B 3/26; F24J 2/00
[52] U.S. Cl. .................... 160/117; 160/213; 52/202; 49/63; 126/417; 165/48.2
[58] Field of Search ................ 126/417; 165/48 S, 18; 52/202, 203, 64; 160/117, 213; 49/370, 63

[56] References Cited

U.S. PATENT DOCUMENTS

| 2,094,801 | 10/1937 | Mass | 52/64 |
|---|---|---|---|
| 2,200,277 | 5/1940 | Howie | 160/117 |
| 3,020,951 | 2/1962 | Graulich | 160/117 |
| 3,679,505 | 7/1972 | Hinderaker et al. | 52/202 |
| 4,068,652 | 1/1978 | Worthington | 165/48 S |
| 4,111,189 | 9/1978 | Dizon | 126/436 |
| 4,242,836 | 1/1981 | Anderson | 49/370 |
| 4,244,354 | 1/1981 | Williams | 126/448 |
| 4,263,896 | 4/1981 | Zebuhr | 126/417 |
| 4,267,666 | 5/1981 | Davidson | 49/370 |
| 4,267,821 | 5/1981 | Nelson | 126/417 |
| 4,286,576 | 9/1981 | McClelland | 126/428 |
| 4,290,416 | 9/1981 | Maloney | 126/400 |
| 4,324,231 | 4/1982 | Reinert | 126/417 |
| 4,412,528 | 11/1983 | Elzinga et al. | 126/417 |
| 4,459,973 | 7/1984 | Royer | 126/417 |
| 4,495,978 | 1/1985 | Carroll | 160/117 |
| 4,512,334 | 4/1985 | Peachey | 126/417 |
| 4,531,511 | 7/1985 | Hochberg | 126/417 |
| 4,532,917 | 8/1985 | Taff et al. | 165/485 |

Primary Examiner—Carl D. Friedman
Assistant Examiner—Michael Safavi
Attorney, Agent, or Firm—Thomas W. Speckman

[57] ABSTRACT

Apparatus for insulating a window or other opening in a building includes a plurality of rail means secured to the building adjacent at least one edge of the opening, and at least one insulated shutter panel slidably engaged with the rail means. Several panels may be assembled into a set of panels or opposing sets of panels installed on opposing sets of rail means, if desired. The shutter panel or panel assembly is capable of substantially exposing or completely covering the opening due at least in part to the sliding action of the shutter panel. The shutter panel or panel assembly may be filled with an energy storage medium, and thus function also to collect, store and release solar energy.

8 Claims, 7 Drawing Figures

INSULATING SHUTTER PANELS FOR BUILDING OPENINGS

RELATED U.S. PATENT APPLICATIONS

This application is a continuation-in-part of U.S. patent application Ser. No. 329,196 filed Dec. 10, 1981 now U.S. Pat. No. 4,475,978.

BACKGROUND OF THE INVENTION

This invention relates to apparatus for insulating a window or other opening in a building, and more particularly to decorative insulated shutter panels capable of substantially exposing or completely covering a building opening by means which include at least in part a sliding action of one or more of the shutter panels relative to the opening.

Recent energy shortages and increases in the cost of maintaining comfortable temperatures in buildings throughout the year have increased the demand for products which conserve energy, and products which collect and store energy. Insulation made of fiberglass or the like is commonly installed in building walls for this purpose. Insulation is generally not installed in window or other openings, however, because it is not transparent and permanently blocks the opening. As a result, windows, doors and other openings are less energy efficient than the building walls, and generally release a great deal of heat during cold months, and absorb it in warm months.

Storm windows and storm doors are often installed in windows and certain doors to increase energy efficiency. Their usefulness is limited, however, because they are rarely sufficiently airtight to be effective, and are not as thermally efficient as fiberglass insulation or the like. Other building openings, such as sliding doors, curved windows and non-rectangular windows are generally not provided with storm windows or the like. Their insulating efficiency may be improved by the use of multiple layers of glass, which is expensive, or by securing plastic or the like to the outside of the opening, which is generally unsightly. Thus, there is a need for practical, inexpensive apparatus for insulating building openings which does not permanently cover the opening, and is not unsightly.

Louvered shutters have been used on the inside of windows for many years. Such shutters are generally specially manufactured to fit a particular window, and are hingedly mounted inside the window frame. The shutters are decorative and provide privacy, but are relatively expensive, and do not insulate the window. Thus, there is a need for decorative window shutters which provide insulation and need not be specially manufactured, to decrease the cost.

Accordingly, an object of this invention is to provide new and improved apparatus for insulating windows or other openings in buildings which does not permanently cover the openings.

Another object is to provide apparatus for insulating windows or other openings in buildings which is relatively inexpensive, and need not be specially manufactured for a particular sized opening.

Yet another object is to provide apparatus for insulating windows or other openings in buildings which is decorative.

Still another object is to provide a new and improved insulating shutter panel which by itself or in a set of panels is capable of substantially exposing or completely covering building openings, due at least in part to a sliding action of one or more of the shutter panels relative to the opening.

Yet another object of this invention is to provide an insulating shutter panel enclosing an energy storage medium capable of collecting and storing energy within and subsequently releasing the stored energy from the shutter panel.

A still further object is to provide shutter panels for windows and other openings which provide security by activating an alarm if an intruder tampers with the panels.

SUMMARY OF THE INVENTION

In keeping with one aspect of this invention, apparatus for insulating a window or other opening in a building includes a plurality of rail means secured to the interior of the building adjacent at least one edge of the opening, and at least one insulated shutter panel slidably engaged with the rail means. Several panels may be assembled into a set of panels or opposing sets of panels installed on opposing sets of rail means, if desired. The shutter panel or panel assembly is capable of substantially exposing or completely covering the opening due at least in part to the sliding action of at least one of the shutter panels relative to the edge. The shutter panel or panel assembly may be filled with insulation or an energy storage medium, such as a phase changing material. The shutter panel or panel assembly may include decorative matter, if desired, and may also include a switch or other means for activating an alarm if an intruder tampers with the shutter apparatus.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

DESCRIPTION OF THE PREFERRED EMBODIMENTS

Figures 1, 2:
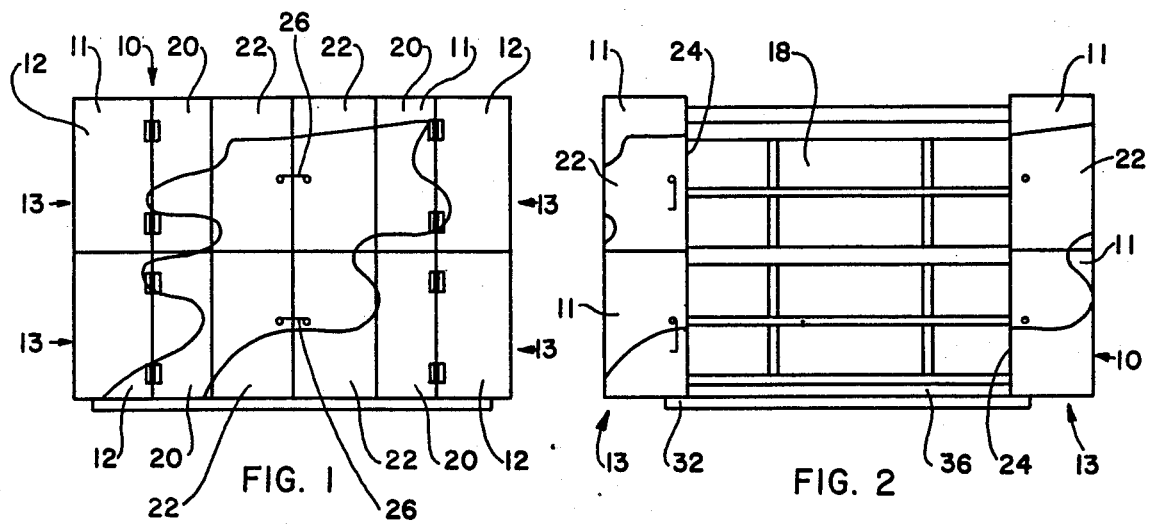
FIG. 1 is a front view of an assembly of the shutter panels of this invention showing the assembly in the closed position.
FIG. 2 is a front view of the assembly of FIG. 1 shown in the open position.

An assembly 10 of insulated shutter panels 11 may be closed to completely cover a window 18 or other opening in a building, as in FIG. 1, or may be opened to substantially expose the opening, as in FIG. 2. Panels 11 conserve energy when in the closed position by retaining heat in the building during cold weather, and keeping the building cooler during warm weather. When the panels 11 are open, light and solar heat may enter the building, the window may be opened, and people inside the building may look out the window. The shutter panels 11 may be used for windows, as in FIGS. 1 and 2, or for doors or other openings, and may be used with or without storm windows or storm doors. The shutter panels are also useful for openings such as sliding doors, irregularly-shaped windows and the like, where storm doors or storm windows are impractical.

The interior volume of insulated shutter panels 11 may be filled with an energy storage medium, such as a phase changing substance, which also serves as an insulator. Phase changing materials store solar heat energy chemically, and are capable of absorbing and releasing far more heat than previously known energy storage media, such as water or rock. Suitable phase changing materials are known to the art and are commonly referred to as solar salts or eutectic salts. Solar energy absorbed during the day by one suitable phase changing material, for example, converts the phase change material from solid to liquid form. Energy stored in the liquid form of the phase changing material may then be released as heat during cooler evening or night hours as the material is converted from the liquid to a solid state due to falling temperatures.

A hydrated salt which changes phase between a liquid and solid form at 55° F. has been developed by the University of Delaware's Institute of Energy Conversion for use in air conditioning systems to store cool air generated during times when off-peak energy rates are applicable. A variation of this system that would store solar heat generated during the day is being developed. Another thermal storage compound comprising calcium chloride hexahydrate has been developed by Dow Chemical which changes phase between a liquid and solid form at 81° F. Any energy storage medium, such as a phase change compound which changes phase between about 50° F. and about 90° F. would be suitable for use with the shutter panels of this invention. A nucleator may be added to the phase change material to prevent supercooling, and dyes may be added to the energy storage medium to improve the aesthetic qualities of the shutter panels.

Energy storage medium, such as phase change compounds are preferably permanently sealed within the interior volume of the shutter. The shutter itself, or an interior liner, comprises a material which is non-reactive with and impermeable to the phase change compound, such as high density polyurethane or polyethylene. The structural shutter itself may comprise molded high density polyurethane or polyethylene or the like, with a phase change material sealed therein. If the structural material and the phase change material are translucent, then when the shutters are closed during the day for collecting and storing heat energy, some light may still penetrate to the interior of the building. If a more decorative shutter panel is desired, a liner comprising high density polyurethane or polyethylene or the like with phase change material sealed therein may be covered with wood, plastic, metal or the like to provide a decorative appearance. The exterior side of the shutter panel may be covered to provide a surface well suited to collecting solar energy, such as a dull black surface, while the interior side of the shutter panel may be covered to provide a decorative appearance.

The assembly 10 may include a single panel 11, a set 13 of panels 11, or two opposing sets 13 of panels 11, and may include several panels 11 or sets 13 of panels 11 placed over each other vertically. Also, decorative matter may be placed on the interior surface of the shutter panels 11, as seen in FIG. 1, to provide an aesthetically pleasing appearance when the shutter panels are closed. The decorative matter may be a picture, a decorative pattern, a mirror surface or the like applied to the panels in a variety of ways, including original painting, adhesive paper or the like. A process for photographing original art work and lithographing it directly onto metal sheets could be easily adapted to this application to provide decorative matter on the panels. The panels could also be molded in the form of conventional louvered shutters, if desired. The outside portions of the panels could be molded to form a case and filled with insulation or an energy storage medium, or the entire panel could be molded insulating plastic.

Figure 3:
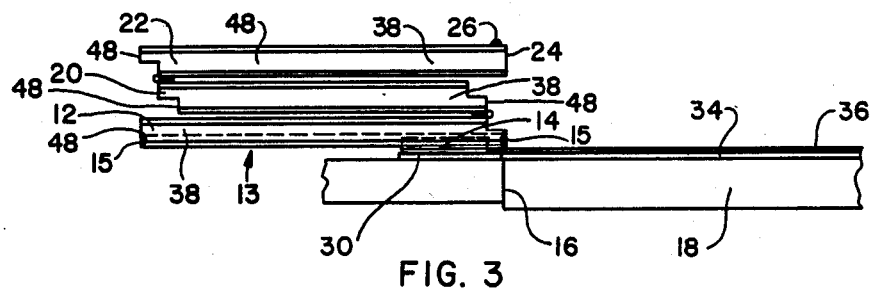
FIG. 3 is a top view of one set of the shutter panels of FIG. 1 in the open position.
Figure 4:
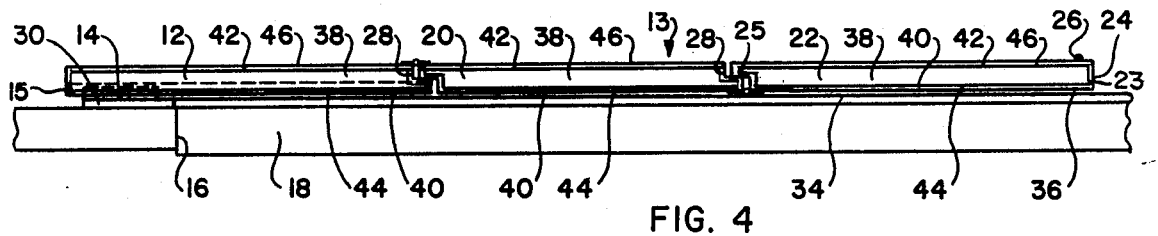
FIG. 4 is a top view of one set of the shutter panels of FIG. 1 in the closed position.
Figures 6, 7:
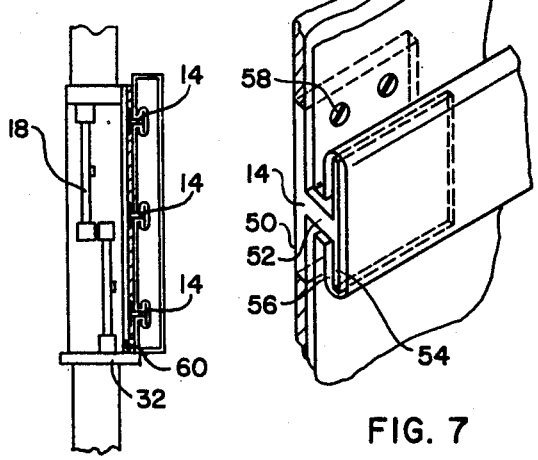
FIG. 6 is a side view of the apparatus of FIG. 5.
FIG. 7 is a cutaway perpsective view of a portion of the apparatus of FIGS. 5 and 6 showing the rail means.

Rail means 14 is secured to the building structure adjacent at least one edge 16 of the opening 18, as in FIGS. 3 and 4, and each assembly 10 includes at least one outside shutter panel 12 which is slidably engaged with rail means 14 by grooves 56 (FIG. 7). At least one stop 15 (FIG. 3) is provided on each end of at least one groove 56 to adjust outside panels for proper opening and closing and to prevent them from accidentally sliding off the rail means 14.

A second shutter panel 20 may be hingedly secured to outside panel 12 to swing away from the opening 18 when opened, and a third shutter panel 22 may be hingedly secured to second panel 20 to fold compactly adjacent outside panel 12 when opened. Additional panels could be used if desired.

When the shutter panel sets 13 are open, as in FIG. 3, the shutter panels 11 lie compactly and neatly along the edge 16 of the opening 18. In the closed position, the outer edges 24 of opposing third panels 22 are adjacent each other, and completely cover the opening 18, as in FIG. 5. The rail means 14 are always concealed from view. Opposing sets 13 may be secured by clasp means 26 when closed, as seen in FIG. 1. Clasp means 26 may be any known latch apparatus. Complementary notches 28 may be provided along adjoining edges of adjacent panels 11 to decrease further the flow of air between the panels, which will further improve the ability of the assembly 10 to conserve energy. The notches 28 may include plastic foam strips or some other material which will further reduce air flow between the panels.

The opening 18 generally includes trim pieces 30 (FIG. 5) along the vertical edges of the opening, sill 32 along the bottom of the opening which extends away from the window further than the trim pieces 30, and a top trim piece 34, which is generally in the same plane as trim pieces 30. Shutter panel assembly 10 may be installed above sill 32, and extends over and beyond trim pieces 30. Assembly 10 extends over top piece 34, and may extend beyond the top piece, if needed. Since the assembly 10 extends beyond trim pieces 30, and may extend beyond top trim piece 34, it need not be specially manufactured for each window or other opening, and standard panel sizes may be used for many different applications.

Figure 5:
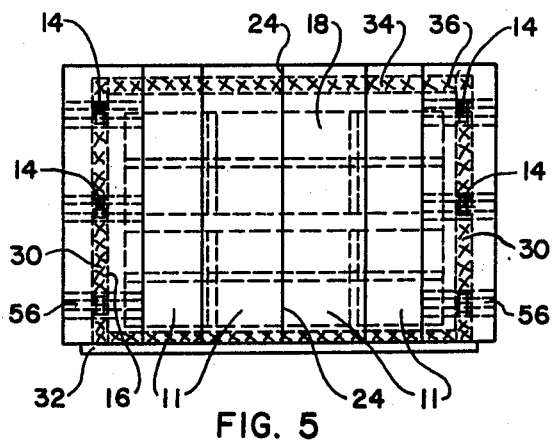
FIG. 5 is an elevation view of the apparatus of this invention showing an assembly of shutter panels in the closed position.

A flexible magnetic strip 36, or some other suitable sealing device, such as foam or the like, may be provided around the opening 18, as in FIG. 5, if desired. An additional trim piece 60 may be provided along sill 32 for installation of a magnetic strip along the lower edge of the assembly, for sealing purposes. The trim piece 60 also acts as a structural stop against lateral movements of the panels toward the outside of the building.

Shutter panels 11 generally include a layer 38 of insulating material such as polyurethane, polyisocyanurate, fiberglass, polystyrene or the like, or layer 38 may comprise an energy storage medium, such as a phase changing material. Face 40 of layer 38 is disposed toward the opening 18, and opposing face 42 is disposed toward the interior of the building. The layer 38 may be molded to form the panel, if desired, and the faces 40, 42 may form the outside surface of the panels. In the alternative, molded or loose insulating material may be enclosed by additional pieces. If layer 38 comprises an energy storage medium such as a phase changing material, faces 40 and 42, along with edge portions 23 and 25, form a sealed casing comprising high density polyethylene or polyurethane or like material which is non-reactive with and impermeable to the energy storage medium. Shutter panels 11 comprising energy storage medium enclosed by an impermeable casing may form a structural shutter unit which is translucent and which allows some light to penetrate to the interior of the building. Alternatively, the sealed casing may be covered on any of its surfaces with a layer of plastic, metal, or the like, such as covers 44, 46 and 48, described below, to provide a more decorative shutter panel, or to provide the shutter panel with greater insulating or energy collecting properties. A shutter panel having a layer 38 comprising energy storage medium, particularly phase changing material, provides a shutter panel having significantly greater insulating properties than a shutter panel of hollow or solid wood, metal or plastic construction. Layer 38 comprising a phase changing material functions as an effective insulator, particularly when the phase changing material is in the solid phase.

Exterior cover 44 may be secured adjacent to the opening face 40, and interior cover 46 may be secured adjacent to interior face 42. Covers 44, 46 may be secured by side covers 48, or any other suitable means. While the covers 44, 46 and 48 may comprise any suitable material, it is contemplated that exterior cover 44 may be thin sheet metal which may be magnetically attracted to magnetic strip 36, interior cover 46 may be metal or other material capable of carrying decorative matter, and side covers 48 may be plastic, which will conserve energy, or metal. When layer 38 comprises an energy storage medium, exterior cover 44 preferably has a dull, dark colored surface facing the exterior of the building to provide enhanced solar energy collection capacity. In outside panels 12, grooves 56 may be formed in the exterior cover 44 by many known means.

Rail means 14 provides support for each set 13 of shutter panels 11. It is contemplated that at least two rails 14 will be required for each set 13. Rails 14 may be secured to the trim 30 as in FIGS. 3 and 4, or may be secured adjacent the edge of the opening 18. If rails 14 are secured to the trim 30, it may be necessary to level the rails 14 with shims or other suitable means.

Rails 14 include a first leg 50 secured to the trim 30, a second leg 52 extending outwardly toward the interior of the building substantially perpendicular to leg 50, and a third leg 54 extending from the outer end of the second leg 52 substantially perpendicular to leg 52. Grooves 56 of outside panel 12 slide on rails 14.

The dimensions of the elements of this invention may vary according to the application. It is contemplated that layer 38, comprising insulating material or an energy storage medium, may be about 1 to 4 inches thick, and the shutter panels 11 may be about 12 inches wide and up to about 36 inches in length. The depth of the rails 14 may be between ½ and 2 inches from the trim pieces 30.

Installation of the shutter panels will be feasible for consumers and other relatively untrained personnel, without elaborate tools and the like. It is contemplated that the rails 14 may be installed in trim 30 by screw means 58 or other suitable means at predetermined intervals. Magnetic-strip 36 may then be installed in accordance with the manufacturer's specifications. Trim piece 60 may be secured to sill 32 as a stop, and as a surface for installation of a magnetic strip 38. Shutter panels 11 may be pre-assembled, and installed by placing the outside panel grooves 56 on rails 14, and inserting stops 15 in the grooves after installation. The stops 15 may be adjusted so that the sets of panels open properly and do not buckle or overlap when closed. Stops 15 may be a barbed cap, a screw device, or the like. Magnetic sensors or switches of various kinds may be attached to the opening or assembly to activate an alarm if an intruder tampers with the panels when closed.

In use, the panels may be closed by folding second panels 20 and third panels 22 over opening 18, and sliding opposing sets of panels together. Magnetic strip 36 will preferably be strong enough to secure the panels and seal them, but will not interfere with the ease of sliding the panels. The panels may also be closed by sliding outside panels 12 toward each other to stops 15 and folding panels 20, 22 over opening 18. Opposing sets 13 may be secured together by clasp means 26. To open the shutters, clasp means 26 must be released, second shutters 20 and third shutters 22 may be pulled away from the opening 18 and folded over outside shutter panels 12, and panels 12 may be moved to the edges 16 of opening 18.

The advantages of this invention are now self-apparent. The assembly of insulated shutter panels conserves energy when closed over an opening in a building, and, when shutter panels enclose an energy storage medium, the shutter panels collect and store heat energy, without permanently covering the opening. In addition, the assembly is aesthetically pleasing when the shutters are closed. The shutters may easily be installed by consumers, and a standard size shutter may be adopted to fit many sized openings, without special fabrication.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. Apparatus for covering a window or other opening in a building comprising:
    a plurality of horizontal rail means secured to the interior of said building adjacent to and extending only outwardly from at least one generally vertical edge of said opening in a plane parallel to said opening;
    at least one shutter panel slidably engaged with said rail means, said rail means extending horizontally a distance substantially less than the width of said slidably engaged shutter panel to provide concealment of said rail means when said slidably engaged shutter panel is in extreme slidable position in each direction and capable of substantially exposing and substantially covering said opening due to the sliding action of said slidable shutter panel relative to said vertical edge;

energy storage medium within the interior volume of said at least one shutter panel capable of collecting, storing and releasing solar energy.

2. The apparatus of claim 1 comprising means for sealing said shutter panel to said building around the edges of said opening.

3. The apparatus of claim 2 wherein said sealing means comprises a magnetic strip around the edges of said opening.

4. The apparatus of claim 1 wherein said rail means comprises a plurality of rails secured to the interior of said building, said rails comprising a first leg secured to said building, a second leg extending outwardly substantially perpendicular to said first leg, and a third leg extending from the outer end of said second leg substantially perpendicular to said second leg, said slidable shutter panels comprising a plurality of grooves for said rails, and a plurality of stops in at least one of said grooves to prevent said shutter panels from sliding off said rails after installation.

5. Apparatus for covering a window or other opening in a building comprising:
- a plurality of horizontal rail means secured to the interior of said building adjacent to and extending only outwardly from at least one generally vertical edge of said opening in a plane parallel to said opening;
- at least one insulated shutter panel slidably engaged with said rail means, said rail means extending horizontally a distance substantially less than the width of said slidably engaged shutter panel to provide concealment of said rail means when said slidably engaged shutter panel is in extreme slidable position in each direction; and
- a second insulated shutter panel hingedly secured to the vertical edge of said slidable panel adjacent said opening in open position, and said hingable panel in combination with said slidable panel being capable of substantially exposing and completely covering said opening due at least in part to the sliding action of said slidable shutter panel relative to said vertical edge;
- energy storage medium within the interior volume of said shutter panels capable of collecting, storing and releasing solar energy.

6. The apparatus of claim 5 wherein said slidable panel and said second panel comprise complementary notches in adjoining edges.

7. The apparatus of claim 6 wherein said notched edges comprise insulating material secured along said edges for sealing said adjoining edges.

8. The apparatus of claim 5 comprising a third panel hingedly secured to said second panel to substantially expose and completely cover said opening.

* * * * *